United States Patent [19]

Barnes et al.

[11] 4,300,179
[45] Nov. 10, 1981

[54] COMPOSITE MAGNETIC HEAD WITH MULTITRACK SUPPORT STRUCTURE

[75] Inventors: Charles A. Barnes, St. Paul Park; Robert A. von Behren, Lilydale, both of Minn.

[73] Assignee: Minnesota Mining and Manufacturing Co., St. Paul, Minn.

[21] Appl. No.: 72,242

[22] Filed: Sep. 4, 1979

[51] Int. Cl.³ .................. G11B 5/22; G11B 5/12; G11B 5/20

[52] U.S. Cl. .................. 360/127; 360/122; 360/123; 360/125

[58] Field of Search ............ 360/127, 118, 121, 123, 360/66, 122, 125

[56] References Cited

U.S. PATENT DOCUMENTS

| | | | |
|---|---|---|---|
| 3,353,168 | 11/1967 | Poumakis | 360/121 |
| 3,485,958 | 12/1959 | Bos et al. | 360/118 |
| 3,562,443 | 2/1971 | Bos et al. | 360/121 |
| 3,827,083 | 7/1974 | Hosaka et al. | 360/121 |
| 3,846,840 | 11/1974 | Childers et al. | 360/118 |
| 3,964,103 | 6/1976 | Thompson et al. | 360/121 |
| 4,110,804 | 8/1978 | Castrodale et al. | 360/118 |
| 4,164,781 | 8/1979 | Brown | 360/121 |

Primary Examiner—Alfred H. Eddleman
Attorney, Agent, or Firm—Cruzan Alexander; Donald M. Sell; William D. Bauer

[57] ABSTRACT

A composite magnetic head adapted to record and read records to and from a record carrier particularly suited to a multitrack record carrier, and more particularly suited to a multitrack magnetic tape. The composite magnetic head may be moved transversely with respect to the direction of movement of the record carrier so that head alignment with any one of multitracks of the record carrier may be achieved. The record carrier contacts the head assembly defining a scrub surface. A yoke is provided supporting a ferrite core containing an effective gap which permits the head to be physically mounted with respect to the record carrier. The yoke is constructed and mounted so that one surface of the yoke is coplanar with the scrub surface of the ferrite core and which extends in both directions transversely to the motion of the record carrier at least a distance equal to the width of the record carrier in each direction so that the record carrier may be evenly supported over the range of movement of the head transverse to the direction of movement of the record carrier. A central open area of the yoke is provided to allow for physical access to the coil windings of the ferrite core.

17 Claims, 8 Drawing Figures

COMPOSITE MAGNETIC HEAD WITH MULTITRACK SUPPORT STRUCTURE

BACKGROUND OF THE INVENTION

This invention relates generally to composite magnetic heads and relates particularly to composite magnetic heads operating with respect to a multitrack record carrier.

The requirements for magnetic data storage over the years has resulted in increased requirements for greater and greater data capacities. The search for an increase in data capacity has, of course, resulted in efforts to obtain a greater data density. One means of increasing the density of data stored in a given magnetic data storage medium is to insert a plurality of tracks where a single track was previously utilized or to increase the number of tracks where a plurality of tracks was already utilized. As the number of tracks in a given magnetic data storage medium is increased, often track-to-track spacing, or the distance between data tracks, must be reduced. As the width of the recording track is reduced and the spacing between recording tracks is reduced, the difficulty of aligning the magnetic head with the recorded track increases. Ideally, as the magnetic head is positioned with respect to a given track, it will be aligned exactly with that recorded track. However, due to inherent tolerances and manufacturing techniques an exact alignment of the magnetic head with the recorded track is, of course, not exactly possible. No matter how carefully the magnetic head is aligned to the recorded track, some mis-alignment is always present. This mis-alignment presents noise problems to the magnetic head reading the recorded track because along the edge of the recorded track, which is not exactly aligned, all previously recorded data has not been completely erased. As the magnetic head passes over the recorded track again this previously recorded data along the edge shows up as noise.

Several prior art patents illustrate partial solutions to this problem. U.S. Pat. No. 3,485,958 to Bos et al, Composite Magnetic Recording and/or Playback Head with Two Side Erasing Heads Having Electrically Conductive Strips, provides a general illustration of prior art tunnel erase head formats. In the tunnel erase head format, two narrow erase-only heads are positioned on either side of the main read/write head for the purpose of erasing previously recorded interfering signals which occur as a result of these lateral positioning errors. U.S. Pat. No. 3,562,443 to Bos et al, Composite Recording/Playback Head With Two Trim Erase Heads Oriented at an Angle to the Record/Playback Head, provides another similar example. Similarly, reference may be had to four IBM Technical Disclosure Bulletins which disclose the various means of having side erase magnetic structures. In particular, these are Side Erase Magnetic Head by J. L. Dawson, IBM Technical Disclosure Bulletin Vol. 8, No. 2, July 1965, Page 220; Tunnel Erase Magnetic Transducer by L. G. Hopkins, IBM Technical Disclosure Bulletin, Vol. 8, No. 4, Sept. 1965, Page 603; Integral Transverse Margin Erase Magnetic Recording Head by D. H. McClung, IBM Technical Disclosure Bulletin, Vol. 8, No. 8, Jan. 1966, Page 1044; and Concurrent Write-Tunnel Erase Element Magnetic Transducers by N. J. McWhinney, IBM Technical Disclosure Bulletin, Vol. 9, No. 7, Dec. 1966, Page 775. Reference may also be had to U.S. Pat. No. 3,353,168 to Poumakis, Wide-Record Narrow-Read Magnetic Head, for another general description of another means of controlling the noise due to previously recorded data and a subsequent lateral positioning error.

These documents have addressed the intertrack noise problem due to lateral positioning errors, but they do not address the problem of maintaining record carrier to magnetic head contact, nor do they address the problem of providing support for the record carrier as the magnetic head is laterally aligned with various recorded tracks in the record carrier. With a record carrier which has a plurality of tracks as the magnetic head is moved transversely with respect to the direction of movement of the record carrier, both the contact between the record carrier and the magnetic head and, particularly with respect to magnetic tape, the support for the portion of the record carrier which is not being read or recorded by the magnetic head must be maintained. The prior art references cited do not address this problem at all.

Also, composite magnetic head assemblies of this type, present problems associated with the assembly and testing of the composite magentic head. It is generally costly and inconvenient to completely assemble the entire composite magnetic head, including the coil windings, before testing or maintenance can occur. Furthermore, once the composite magnetic head is completely assembled and then it turns out that the head for some reason is faulty, it is likely that the entire head must be discarded. This is particularly aggrevating with respect to a faulty winding in the coil, for example. If some means were provided whereby the composite magnetic head could be partially disassembled for maintenance and tested in actual use, it is likely that the production yield of such composite magnetic heads could be increased.

SUMMARY OF THE INVENTION

Accordingly, the present invention provides a composite magnetic head adapted to record and read records to and from a record carrier movably contacting the composite magnetic head. A ferrite core having a substantially U-shape and having two legs and a base with an effective gap at the base of the U-shape is provided. The ferrite core has a scrub surface where the record carrier contacts the ferrite core. A yoke is further provided for receiving the ferrite core and has a surface coplanar with the scrub surface of the ferrite core which extends in both directions transversely to the direction of motion of the record carrier at least a distance equal to the width of the record carrier. In this manner, the record carrier is physically supported by the composite magnetic head as the composite magnetic head is moved transversely to the direction of movement of the record carrier in order to be aligned with any track on a multi-tracked record carrier. This is particularly advantageous in one embodiment of the present invention where the record carrier is magnetic tape.

In another embodiment of the present invention, first and second erase ferrite cores having a substantially U-shape and having two legs and a base with an effective gap at the base of the U-shape are positioned transversely on either side of the first ferrite core, the read/write ferrite core. The first and second erase ferrite cores have a scrub surface where the record carrier contacts the erase ferrite cores which is coplanar to the scrub surface of the read/write ferrite core. The first and second erase ferrite cores are provided for the purpose of providing a tunnel erase capability. A central open area is provided in the yoke to provide access to the coil windings for assembly, test and maintenance purposes.

A composite magnetic head so constructed provides a number of principal advantages. The composite magnetic head can be successfully operated with a multi-track record carrier, as for example, magnetic tape, to be moved relative to the tracks on the record carrier and still support the magnetic tape over the entire width of the magnetic tape thereby maintaining critical composite magnetic head to magnetic tape contact. Further, the composite magnetic head of the present invention provides for narrow track-to-track spacing due to the tunnel erase effect of the side erase ferrite cores. In addition, in one embodiment of the present invention, the ferrite cores are composed of a magnetic ferrite such as a composition of manganese zinc ferrite or nickel zinc ferrite and the yoke is composed of a ceramic material in which both the core and yoke materials are generally matched for wear characteristics so that the entire surface of contact, i.e., the scrub surface of the composite magnetic head wears evenly as the composite magnetic head moves back and forth across the record carrier so that a minimum amount of grooving or cupping will occur. In addition, in one embodiment of the invention, the temperature coefficient of the expansion of the ceramic yoke and the magnetic ferrite cores are matched providing an integral assembly which may operate over a wide range of temperatures.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENTS

The preferred embodiments of the present invention are illustrated by way of example in FIGS. 1-8. These figures illustrate the present invention as containing a central read/write ferrite core assembly and two erase ferrite core assemblies assembled on either side. It is recognized, however, that a preferred embodiment of the present invention including the support structure for the ferrite cores may be just as easily constructed having only the central read/write ferrite cores and without the laterally positioned erase ferrite cores. In the construction of the composite magnetic head without the laterally positioned erase ferrite cores, the composite magnetic head would not have tunnel erase capability, but this does not detract from the operation, utilization and advantages of the central read/write ferrite core and accompanying ferrite bar, coil windings and yoke structure.

Figure 1:
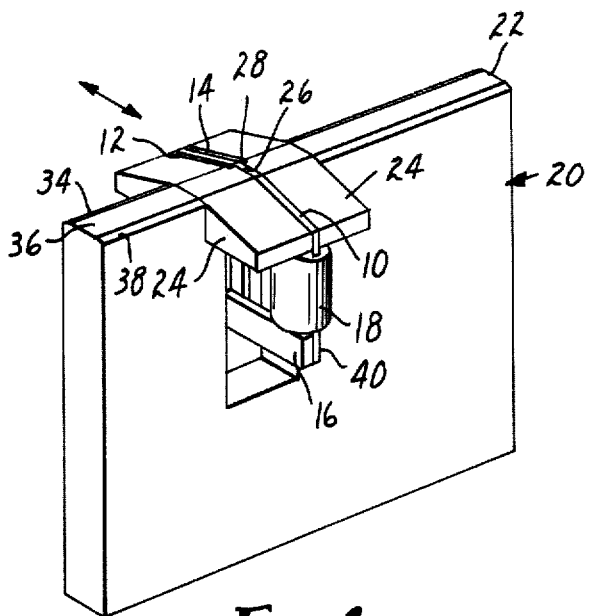
FIG. 1 is an overall perspective view of the composite magnetic head, including complete ferrite cores with windings and the supporting yoke structure.

With particular reference to FIG. 1, a read/write ferrite core 10 is central to the construction of the composite magnetic core. In FIG. 1 the read/write ferrite core 10 having a substantially U-shape with two legs extending downward is illustrated as assembled in the completed composite magnetic core. The exact shape and other details of the read/write ferrite core will become more readily appaent with reference to the subsequent figures. Also illustrated in FIG. 1 are two erase ferrite cores 12 and 14 which are positioned immediately adjacent to the read/write ferrite core 10. The two legs of the read/write ferrite core 10 are magnetically connected by a ferrite bar 16. The coil windings for the read/write ferrite core 10 are illustrated by the read/write coil 18 which is wrapped around one of the legs of the read/write ferrite core 10. The entire assembly of read/write ferrite core 10 and erase ferrite cores 12 and 14 are assembled in a yoke 20. The yoke 20 has a top surface 22 which follows the same contour as the scrub path of the record carrier as it passes over the read/write ferrite core 10 and erase ferrite cores 12 and 14. This exact contour and construction will become more readily apparent with reference to the remaining drawings. It is also noted in FIG. 1 that a support bar 24 is provided in conjunction with the yoke 20 and serves the same purpose as the yoke 20 and again has a top surface contour 22 identical to that of the scrub path of the record carrier. The support bar 24 is provided to provide additional mechanical support for the read/write ferrite core 10 and for the erase ferrite cores 12 and 14. It is recognized, however, that support bar 24 provides no additional function and that another construction of the ferrite cores 10, 12 and 14 may provide enough structural integrity in themselves so that the support bar 24 may not be required.

Figure 2:
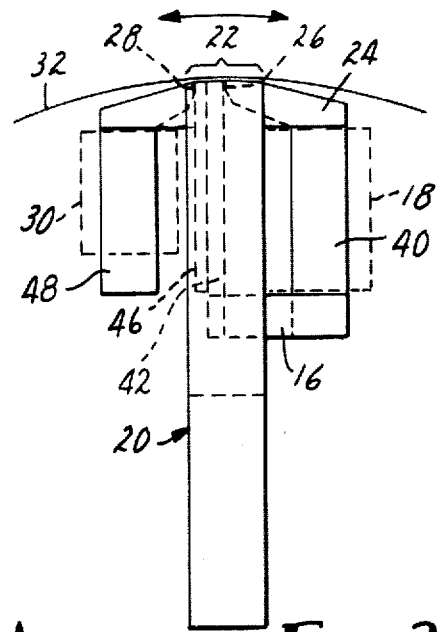
FIG. 2 is an end view of the same composite magnetic core of FIG. 1 also illustrating the path of the record carrier.

FIG. 2 illustrates the end view of the same composite magnetic head of FIG. 1. The read/write ferrite core 10 is again illustrated central in the construction of the composite magnetic head. On either side of the read/write ferrite core 10, i.e. in this case the near side and the far side of the read/write ferrite core 10 are positioned erase ferrite cores 12 and 14. Since this is an end view and the erase ferrite cores 12 and 14 are positioned one exactly in front of and behind the other, the view shows only one of the two erase ferrite cores 12 and 14. Note that the read/write ferrite core 10 is constructed substantially in a U-shape with the effective gap 26 located at the top in the FIG. 2 or at the base of the U-shape. Notice that the U-shape of the read/write ferrite core 10 consists of a central leg 42 and an outer leg 48 extending to the right in FIG. 2 and that the erase ferrite cores 12 and 14 also consist substantially of a U-shape containing a central leg 46 and an outer leg 48 extending to the left in FIG. 2 or the opposite side from the direction in which the outer leg of the read/write ferrite core 10 extends. The erase ferrite cores 12 and 14 also have an effective gap at the top in FIG. 2 or at the base of their U-shape. The ferrite bar 16 is shown in FIG. 2 connecting the two legs (40 and 42) of the read/write ferrite core 10 together. The read/write coil 18 is shown positioned wound on the outer leg 40 of read/write ferrite core 10. Erase coil 30 is shown wound around the outer leg 48 of both erase coils 12 and 14. Since the erase coil 30 is wound around both erase ferrite cores 12 and 14 only one erase coil 30 is required instead of two. Again, as in FIG. 1, the entire ferrite core assemblies including ferrite bar 16 and coils 18 and 30 are held together and positioned by yoke 20. The top surface of yoke 20 in FIG. 2 can be seen as having a contour substantially identical to that of the scrub surface 22 of the read/write ferrite core 10 and erase ferrite cores 12 and 14. The record carrier 32 is shown positioned in FIG. 2 to illustrate the area of contact, the scrub surface 22, between the record carrier 32 and the composite magnetic head and the direction of travel of the record carrier 32. While the record carrier 32 is illustrated as being spaced from the scrub surface 22 for clarity, it is recognized that in operation the record carrier 32 would contact the scrub path 22.

Figure 3:
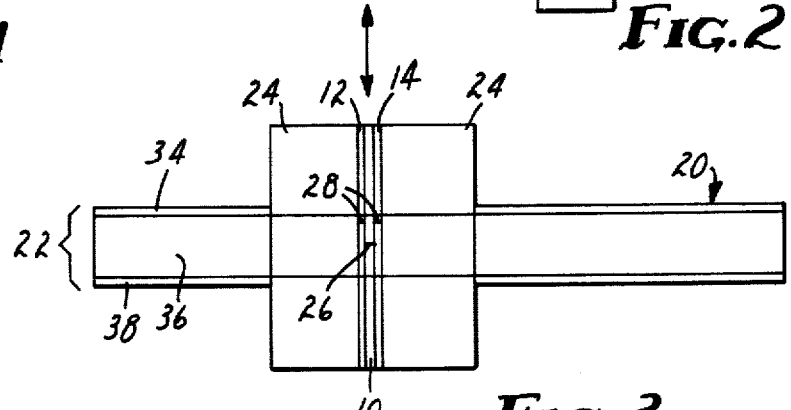
FIG. 3 is a top view of the composite magnetic core described in FIG. 1, illustrating in detail the placement of the effective gap of both the read/write ferrite core and the two erase ferrite cores.

FIG. 3 illustrates a top view of the composite magnetic head previously described in FIG. 1. Again, a read/write ferrite core 10 is provided sandwiched between two erase ferrite cores 12 and 14. The read/write ferrite core 10 has an effective gap 26 at the center of its base which is also the center point of the scrub path 22. The erase ferrite cores 12 and 14 also each have an effective gap 28 which is located off-set from the center of the scrub path 22. The read/write effective gap 26 is positioned at the center of the scrub path 22, since it is the most critical effective gap. It is positioned at the center point of the scrub path 22 to provide it with the closest proximity and most intimate contact with the record carrier 32. Effective gaps 29 merely providing an erase function are not nearly as critical as the effective gap 26, thus, effective gaps 28 may be positioned slightly off of the center line of the scrub path 22. Again in FIG. 3, yoke 20 is shown as supporting the ferrite cores 10, 12 and 14 and also containing a top contour which is substantially the same as the scrub surface 22 of the ferrite cores 10, 12 and 14. Also illustrated in FIG. 3 is support bar 24 which is illustrated for purposes of providing additional physical support for the assembly of the ferrite cores 10, 12 and 14.

Figure 4:
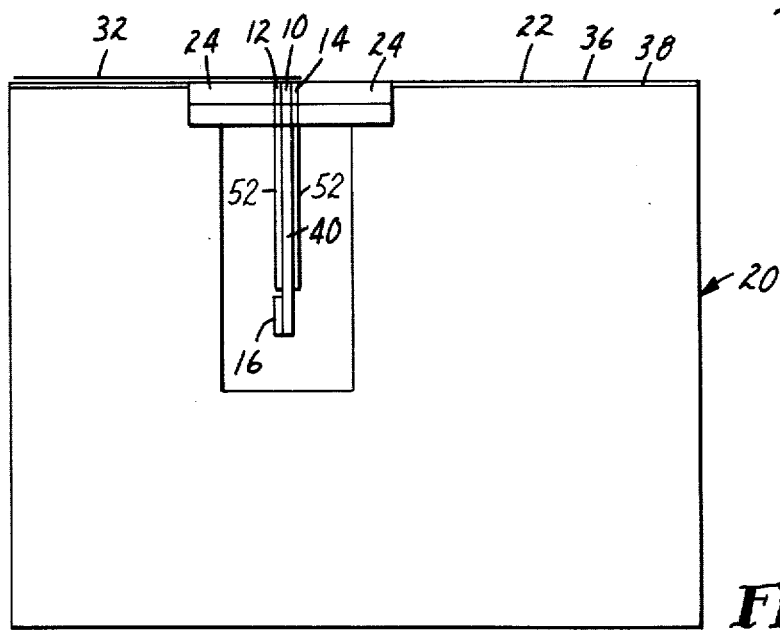
FIG. 4 is a side view of the composite magnetic head of FIG. 1 without the coil windings.

FIG. 4 illustrates a side view of the composite magnetic core of FIG. 1 and, for ease of illustration, without showing read/write coil 18 nor erase coil 30. Again, a read/write ferrite core 10 is sandwiched between two erase ferrite cores 12 and 14 the top surface of which prescribes a scrub surface 22 which is defined as the surface which contacts the record carrier. A ferrite bar 16 is shown magnetically connecting the two legs of the U-shaped read/write ferrite core 10. A yoke 20 including the support bar 24 is shown as receiving the ferrite core assembly and holding it so that it may be positioned with respect to the record carrier 32. In FIG. 4, the record carrier 32 is viewed in transverse cross-section. If the record carrier 32 contains a plurality of tracks containing records, the composite magnetic head in general and in particular the read/write ferrite core 10 must be re-positioned to the left or to the right in FIG. 4 in order to be properly positioned to record or read all of the tracks contained in the record carrier 32. Thus, it is necessary that the read/write ferrite core 10 be able to be positioned from one extreme edge of the record carrier 32 to the other. As illustrated in FIG. 4, the read/write ferrite core 10 is positioned along the right edge of the record carrier 32. It is important to note that the top surface of the yoke 20 including the support bar 24 provides support for the record carrier over its entire width. In order to accomplish this, the yoke 20 must extend in each direction from the read/write ferrite core 10 a distance at least as wide as the record carrier itself. As an example, if the record carrier 32 was composed of ¼ inch magnetic tape, then the distance from the read/write magnetic core 10 to the extreme left edge of the yoke 20 must be at least ¼ of an inch or, put another way, the overall dimensions of the yoke 20 must be twice the width of the record carrier 32 or, in this case, at least ½ inch. In a preferred embodiment, it is anticipated that the read/write ferrite core 10 may be positioned entirely off of the record carrier 32. In this case, one of the two sides of the yoke 20 must be longer than the width of the record carrier 32. In this case, the right-hand side of the yoke 20 is shown in FIG. 4 as being wider than the record carrier 32 so that the read/write ferrite core 10 may be positioned entirely off of the record carrier 32. Note also in FIG. 4 that the yoke 20 is shown having a central cut-out area around the position of the ferrite cores 10, 12 and 14 for the purpose of providing an area of access should the coils to be connected to the ferrite cores be desired to be removed, maintained and reinstalled while the ferrite cores 10, 12 and 14 are contained in the yoke 20.

Figure 5:
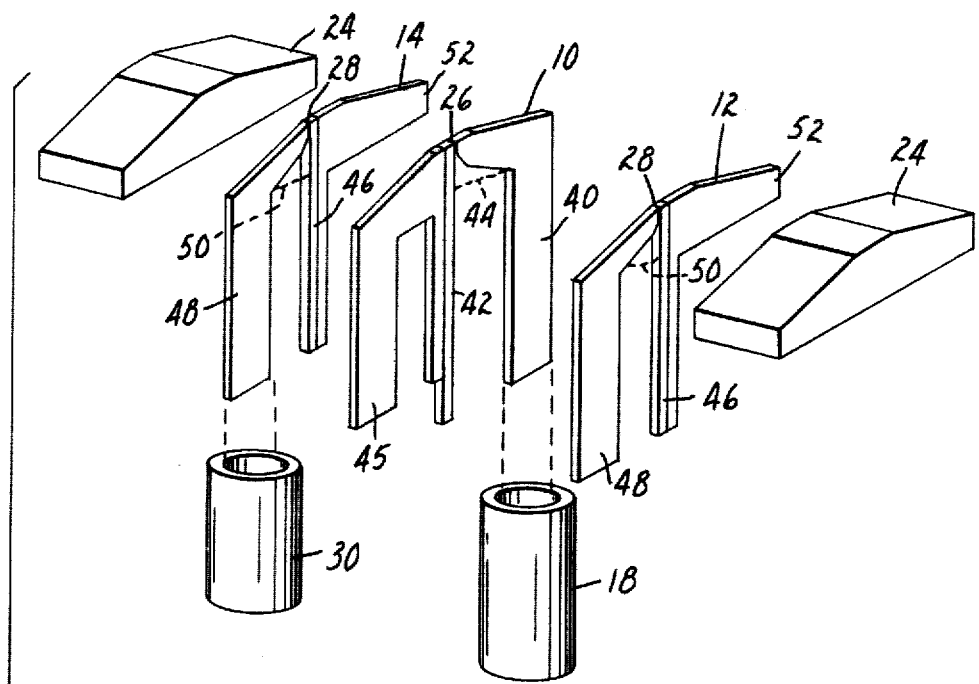
FIG. 5 is an exploded view of the composite magnetic core of FIG. 1.
Figure 5:
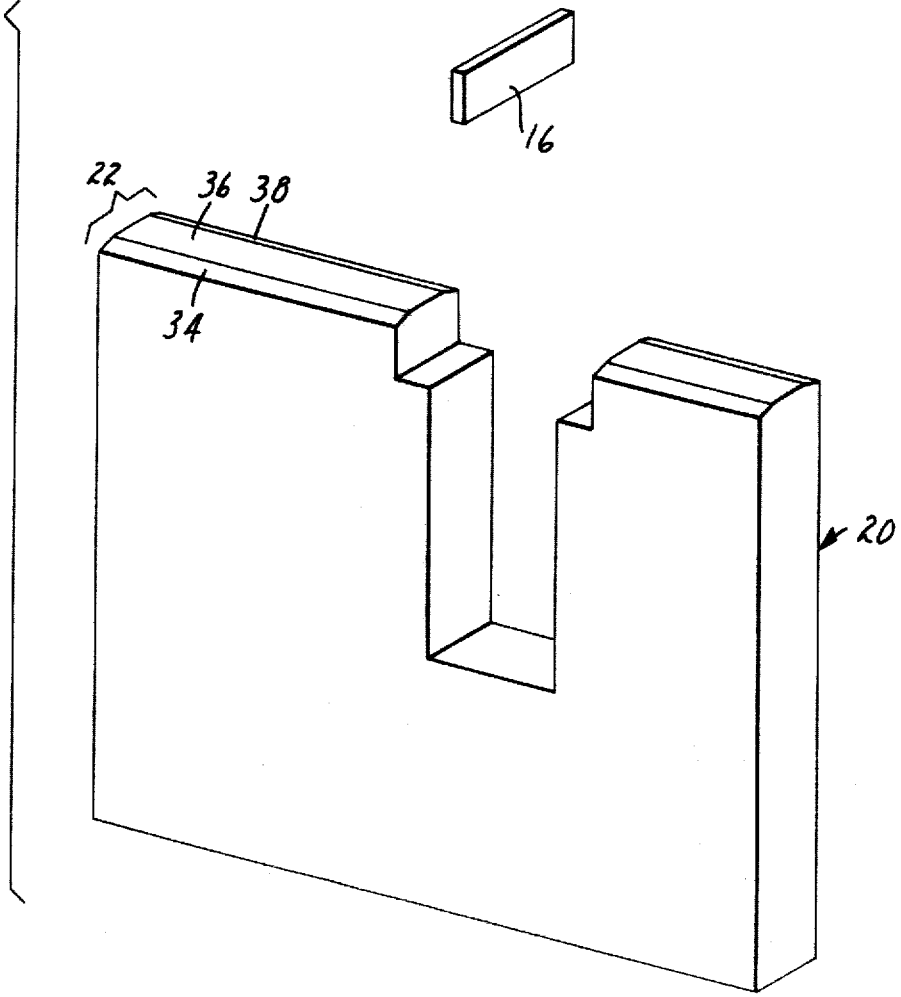

FIG. 5 shows an exploded view of the composite magnetic core. Here read/write ferrite core 10 containing effective gap 26 is shown sandwiched between erase ferrite cores 12 and 14 containing effective gaps 28. Support bar 24 is shown sandwiching the three ferrite cores 10, 12 and 14 to provide additional physical support. Read/write coil 18 is shown being slipped over the outer leg 40 of read/write ferrite core 10 and erase coil 30 is shown to be slipped over the outer legs 48 of the combined erase ferrite cores 12 and 14. To complete the read/write ferrite assembly, a ferrite bar 16 is shown to magnetically connect the two legs (40 and 42) of the U-shape read/write ferrite core 10. Note that no analogous bar is required on erase ferrite cores 12 and 14, since the erase coil 30 intended to contain only D.C. current for the purpose of providing a signal to eliminate the intertrack noise and not necessarily to erase the entire previously recorded signal there. Note that in another preferred embodiment, however, the legs of the U-shaped erase ferrite cores 12 and 14 could very well be connected by another ferrite bar similar to the ferrite bar 16 connecting the read/write ferrite assembly. In FIG. 5, the entire ferrite assembly and support bar 24 is then mounted in the yoke assembly 20. As previously noted, the ferrite portion of the read/write ferrite core 10 extends into the right in FIG. 5, while the ferrite portions of erase ferrite cores 12 and 14 extend to the left. Also illustrated in FIG. 5, additional non-magnetic spacers (45 and 52) are illustrated connected to the associated ferrite cores for the purpose of providing a solid integral assembly. These non-magnetic spacers merely provide additional physical support to the ferrite assemblies.

Figure 6:
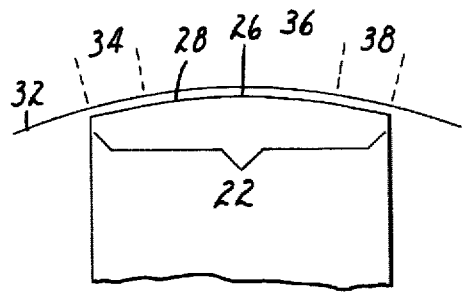
FIG. 6 is a detailed cross-sectional view of the scrub path maintained by the record carrier on the composite magnetic head.

FIG. 6 illustrates in a cross-sectional close-up diagram the detail of the scrub surface 22 of the ferrite cores and of the yoke assemblies. The scrub surface 22 is shown in cross-sectional view with the record carrier 32 passing over. Note again that the record carrier 32 is shown spaced from the scrub surface 22 for clarity. Note also that the scrub surface 22 is composed of three segments 34, 36 and 38. The central segment 36, at the center of which is the read/write effective gap 26, is seen composed of a segment of a circle. In the planar view, of course, this circle would translate to a segment of a cylinder running the entire length of the top surface of the yoke. The outer segments 34 and 38 of the scrub surface 22 comprise a straight, flat linear plane. The erase effective gaps 28 are illustrated as being positioned approximately at the juncture between the central segment 36 and one of the outer segments, in this case 34. It can be seen that the record carrier 32 comes in most intimate contact with segment 36 with the read/write effective gap 26 located at the very center of segment 36, therefor read/write effective gap 26 would have the most intimate contact with the record carrier 32. The erase effective gaps 28, although off-set from the center, located at the edge of the cylindrical portion of the scrub surface 22 will maintain fairly intimate contact with the record carrier 32.

Figure 7:
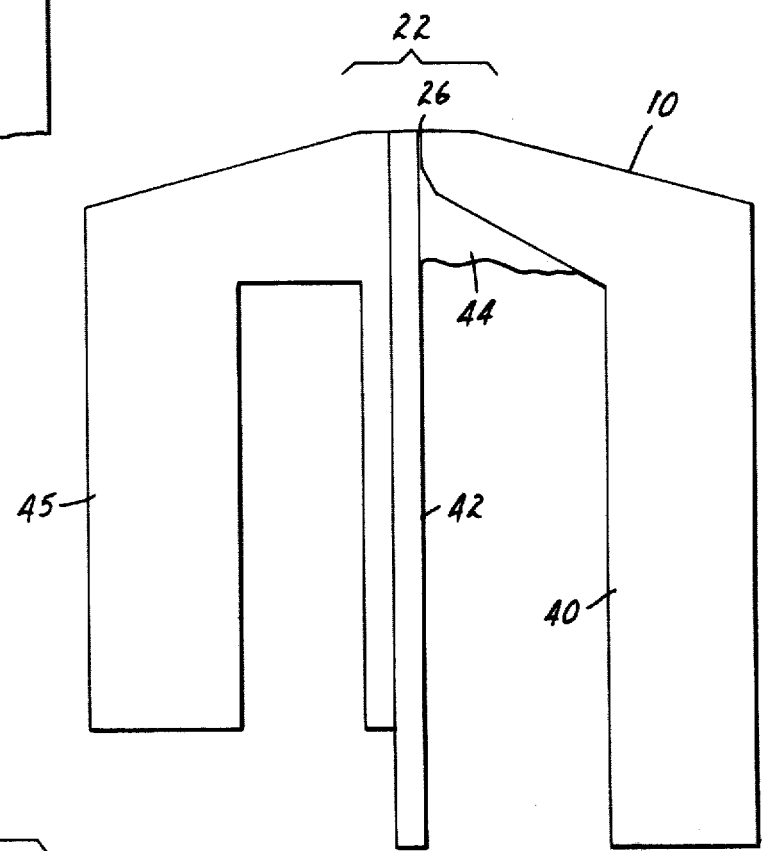
FIG. 7 is a side view of the read/write ferrite core.

FIG. 7 illustrates a side view in more detail of the read/write ferrite core 10. The ferrite portions of the read/write ferrite core 10 are illustrated by members 40 and 42. Member 42 is a ferrite material consisting approximately of a straight bar while ferrite member 40 is constructed in a dog-leg shape. The members 40 and 42 come together and comprise the effective gap 26. For ease of manufacture and assembly, ferrite members 40 and 42 are joined together by a glass bond illustrated by glass material 44. As previously described, for spacer considerations upon assembly, the left-hand side of the read/write ferrite core 10 is constructed of a non-magnetic member 45 to provide spacing between the erase ferrite cores 12 and 14 upon assembly. In a preferred embodiment, the ferrite material used for members 40 and 42 would be a magnetic ferrite such as a composition of manganese zinc ferrite or nickel zinc ferrite. The glass bond procedure and material illustrated at 44 to produce the effective gap 26 is well known in the magnetic recording art. The non-magnetic member 45, in one embodiment consists of a ceramic material and in one embodiment consists of either barium titanate, or calcium titanate which may be bonded to ferrite member 42 in a conventional manner. In one preferred embodiment, the read/write effective gap 26 would be approximately 45 to 50 micro-inches. Also in one embodiment, the thickness of the read/write ferrite core 10 would be approximately 0.009 of an inch. The angle at which the shoulder of members 40 and 45 are angled down from the relatively flat scrub surface 22 is not critical and may be selected as a design choice consistent with avoiding contact with the record carrier. In a preferred embodiment, this angle is approximately 10 degrees. The length and thickness of the ferrite members 40 and 42 again is primarily a matter of design choice. In one embodiment, however, the members are about ¼ of an inch long with member 40 being approximately 0.050 of an inch wide and member 42 approximately 0.010 of an inch wide.

Figure 8:
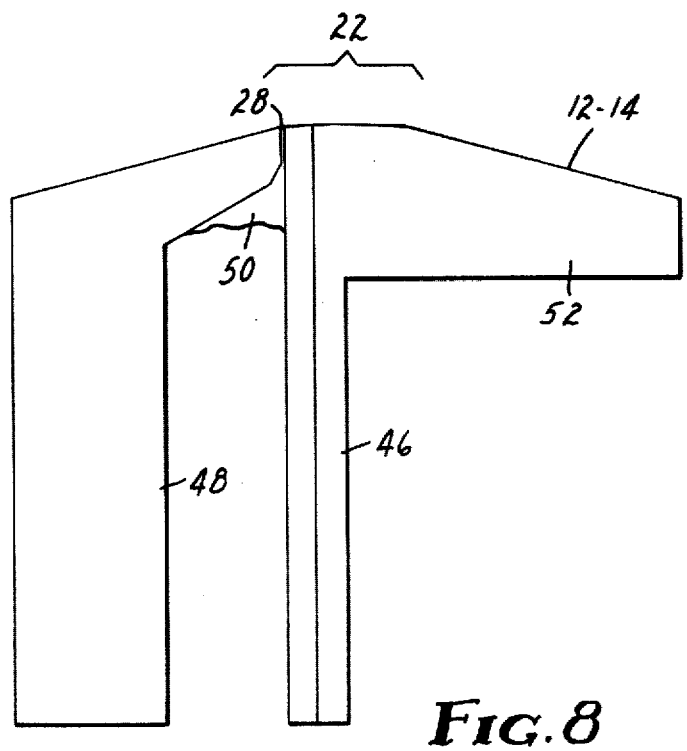
FIG. 8 is a side view of the erase ferrite cores.

FIG. 8 illustrates the erase ferrite cores 12 and 14 in more detail. Again, the erase ferrite cores 12 and 14 consist substantially of a U-shape comprised of members 46 and 48. Member 46 is constructed of a ferrite material substantially consisting of a straight linear bar, while member 48 also constructed of the ferrite material consists of a dog-leg shaped piece of material connected at the top by a glass bond 50 and creating the erase effective gap 28. Member 52 is a non-magnetic spacer designed to support the ferrite portion of the read/write ferrite core 10 when the assembly is complete. Again the ferrite portions of the erase ferrite cores 12 and 14 may be constructed of a similar magnetic ferrite to the read/write ferrite core 10. Also, non-magnetic material 52 may be constructed of a ceramic material, such as barium titanate or calcium titanate. The effective gap 28 may be any number of which, which is primarily design choice. In one preferred embodiment, this effective gap 28 is approximately 80 micro-inches wide. The thickness of the erase ferrite cores 12 and 14 in one embodiment may be approximately 0.005 of an inch. The width of the scrub surface 22 in one embodiment may be approximately 0.040 of an inch. The remaining members of the erase ferrite cores 12 and 14 may be constructed similarly to the read/write ferrite core 10.

Similarly, the yoke 20 and other non-magnetic portions of the composite magnetic head may be constructed of a ceramic material, such as the barium titanate or calcium titanate utilized in the construction of the core assembly. It is significant that the barium titanate or calcium titanate ceramic material utilized for the non-magnetic parts has a wear composition which is similar to the nickel-zinc composition utilized for the ferrite material. This will enable the entire composite magnetic head to wear relatively evenly as the record carrier moves back and forth in a transverse direction over the composite magnetic head assembly. It may also be desirable to construct the ceramic material and the ferrite materials in a manner sufficient so that the temperature coefficient of expansion of the two materials are approximately the same to facilitate ease of manufacture, as for example during glass bonding, and to enable the composite magnetic head to operate over a wide range of temperatures.

The present invention provides a composite magnetic head which may be easily utilized in a multitrack environment of a record carrier and which will maintain intimate contact between the record carrier and the composite magnetic head and support the record carrier over the entire range of tracks to be recorded or read.

While the present invention has been disclosed in connection with the preferred embodiment thereof, it should be understood that there may be other embodiments which fall within the spirit and scope of the invention as defined by the following claims:

What is claimed is:

1. A composite magnetic head adapted to record and read records to and from a record carrier movably contacting said composite magnetic head, comprising:
 a ferrite core having a substantially U-shape having two legs and a base with an effective gap at the base of said U-shape, said ferrite core having a scrub surface where said record carrier contacts said ferrite core; and
 a yoke receiving said ferrite core and having a surface coplanar with said scrub surface of said ferrite core and extending in both directions transversely to the direction of motion of said record carrier at least a distance equal to the width of said record carrier;
 whereby said record carrier is physically supported by said composite magnetic head when said composite magnetic head is moved transverse to the direction of movement of said record carrier.

2. A composite magnetic head as in claim 1 which further comprises a ferrite bar magnetically interconnected between said two legs of said ferrite core.

3. A composite magnetic head as in claim 2 which further comprises a coil wound on one of said two legs of said ferrite core for enabling records to be recorded on said record carrier and for receiving records to be read from said record carrier.

4. A composite magnetic head as in claim 3 in which said yoke is composed of ceramic material.

5. A composite magnetic head as in claim 4 where said scrub surface comprises a central portion comprising a segment of a cylinder and two portions on either side of said central portion, each comprising a linear plane.

6. A composite head as in claim 5 where said yoke is shaped to contain a central open area to accomodate physical access to said ferrite bar and said coil.

7. A composite head as in claim 6 where said ferrite core and said ferrite bar comprises a composition of nickel and zinc, said yoke comprises a material selected from the group consisting of barium titanate and calcium titanate, and where the temperature coefficient of expansion of said ferrite, ferrite bar and said yoke are substantially matched.

8. A composite magnetic head as in claim 7 wherein said record carrier is magnetic tape.

9. A composite magnetic head adapted to record and read records to and from a record carrier movably contacting said composite magnetic head, comprising:
 a read/write ferrite core having a substantially U-shape having two legs and a base with an effective gap at said base, said ferrite core having a scrub surface where said record carrier contacts said read/write ferrite core;
 first and second erase ferrite cores having a substantially U-shape having two legs and a base with an effective gap at said base, said first and second erase ferrite cores positioned transversely on either side of said read/write ferrite core and said first and second erase ferrite cores having a scrub surface where said record carrier contacts said erase ferrite cores which is coplanar to said scrub surface of said read/write ferrite core; and
 a yoke receiving said read/write ferrite core and said first and second erase ferrite cores, said yoke having a surface coplanar with said scrub surface of said read/write ferrite core and extending in both directions transversely to the direction of motion of said record carrier at least a distance equal to the width of said record carrier; whereby said record carrier is physically supported by said composite magnetic head when said composite magnetic head is moved transverse to the direction of movement of said record carrier.

10. A composite magnetic head as in claim 9 in which said read/write ferrite head further comprises a ferrite bar magnetically interconnected between said two legs of said read/write ferrite core.

11. A composite magnetic core as in claim 10 which further comprises:
 a first coil wound on one of said two legs of said read/write ferrite core for enabling records to be recorded on said record carrier and for receiving records to be read from said record carrier; and
 a second coil wound around one leg of each of said first and second erase ferrite cores for providing erase signals to said record carrier.

12. A composite magnetic head as in claim 11 in which said yoke is composed of ceramic material.

13. A composite magnetic head as in claim 12 where said effective gap of said read/write ferrite core is positioned orthogonal to the direction of motion of said record carrier and midway along said scrub surface and where said effective gap of both of said first and second erase ferrite cores are positioned orthogonal to the direction of motion of said second carrier and at one edge of said scrub surface.

14. A composite magnetic head as in claim 13 where scrub surface comprises a central portion comprising a segment of a cylinder and two portions on either side of said central portion, each comprising a linear plane.

15. A composite head as in claim 14 where said yoke is shaped to contain a central open area to accomodate physical access to said ferrite bar and said first and second cores.

16. A composite head as in claim 15 where said read/write ferrite core and said first and second erase ferrite cores and said ferrite bar comprise a composition of nickel and zinc, said yoke comprises a material selected from the group consisting of barium titanate and calcium titanate, and where the temperature coefficient of expansion of said read/write ferrite cores, said first and second erase ferrite cores, said ferrite bar and said yoke are substantially matched.

17. A composite magnetic head as in claim 16 where said record carrier is magnetic tape.

* * * * *